United States Patent
House et al.

(10) Patent No.: US 8,888,447 B2
(45) Date of Patent: Nov. 18, 2014

(54) ANTI-ROTATION METHOD FOR A ROLLING ELEMENT BEARING CARTRIDGE

(75) Inventors: Timothy House, Hendersonille, NC (US); Paul Diemer, Arden, NC (US); Allan Kelly, Hendersonville, NC (US); Augustine Cavagnaro, Flat Rock, NC (US)

(73) Assignee: BorgWarner Inc., Auburn Hills, MI (US)

( * ) Notice: Subject to any disclaimer, the term of this patent is extended or adjusted under 35 U.S.C. 154(b) by 509 days.

(21) Appl. No.: 13/264,763

(22) PCT Filed: Apr. 16, 2010

(86) PCT No.: PCT/US2010/031335
§ 371 (c)(1),
(2), (4) Date: Oct. 17, 2011

(87) PCT Pub. No.: WO2010/123762
PCT Pub. Date: Oct. 28, 2010

(65) Prior Publication Data
US 2012/0034073 A1    Feb. 9, 2012

Related U.S. Application Data

(60) Provisional application No. 61/170,797, filed on Apr. 20, 2009.

(51) Int. Cl.
*F01D 25/16* (2006.01)
*F02C 6/12* (2006.01)
*F02B 39/14* (2006.01)
*F02B 39/00* (2006.01)

(52) U.S. Cl.
CPC . *F01D 25/16* (2013.01); *F02C 6/12* (2013.01); *F02B 39/14* (2013.01); *F02B 39/00* (2013.01)
USPC ........................................................ 415/177

(58) Field of Classification Search
CPC ........... F01D 25/18; F01D 25/14; F02C 6/12; F04D 29/0563; F04D 29/059; F04D 29/06
USPC ........ 415/206, 229, 177; 417/423.12, 423.14, 417/407; 384/906
See application file for complete search history.

(56) References Cited

U.S. PATENT DOCUMENTS 1,326,892 A * 12/1919 Reynolds ....................... 384/495
2,877,068 A *  3/1959 Schaefer ....................... 384/537

(Continued)

FOREIGN PATENT DOCUMENTS

| CN | 1890475 | 1/2007 |
| EP | 1905979 | 4/2008 |

(Continued)

*Primary Examiner* — Edward Look
*Assistant Examiner* — Eldon Brockman
(74) *Attorney, Agent, or Firm* — Miller Canfield (57) ABSTRACT

To solve heat soak and reduced heat rejection capability problems in turbochargers with rolling element bearings (REBs), the REB cartridge is mounted to the bearing housing in a way that is not rigid, thus allows for an oil damping film, but, at the same time, the REB cartridge is held both axially, to transfer thrust loads to the bearing housing, and rotationally, so that the REB cartridge does not rotate relative to the bearing housing, using male or female features in the REB and corresponding female or male features associated with the bearing bore or the turbine face of the bearing housing closure.

10 Claims, 8 Drawing Sheets

(56) References Cited

U.S. PATENT DOCUMENTS

| | | | |
|---|---|---|---|
| 2,935,364 A * | 5/1960 | Smith | 384/495 |
| 3,043,636 A * | 7/1962 | MacInnes et al. | 384/287 |
| 4,240,677 A * | 12/1980 | Payne et al. | 384/252 |
| 4,429,927 A * | 2/1984 | Kawabata | 384/585 |
| H242 H * | 4/1987 | Eng | 29/525 |
| 4,943,170 A * | 7/1990 | Aida | 384/99 |
| 4,983,050 A * | 1/1991 | Aida | 384/99 |
| 4,997,290 A * | 3/1991 | Aida | 384/99 |
| 5,076,766 A * | 12/1991 | Gutknecht | 417/407 |
| 5,145,334 A * | 9/1992 | Gutknecht | 417/407 |
| 5,403,154 A * | 4/1995 | Ide | 415/229 |
| 5,443,316 A * | 8/1995 | Deane et al. | 384/485 |
| 5,482,384 A * | 1/1996 | Lyle | 384/537 |
| 5,899,574 A * | 5/1999 | Chujo | 384/518 |
| 5,961,222 A * | 10/1999 | Yabe et al. | 384/476 |
| 6,017,184 A * | 1/2000 | Aguilar et al. | 415/112 |
| 6,250,897 B1 * | 6/2001 | Thompson et al. | 417/407 |
| 6,270,260 B1 * | 8/2001 | Hale | 384/537 |
| 6,666,583 B2 * | 12/2003 | Nieman et al. | 384/537 |
| 6,729,765 B2 * | 5/2004 | Ni et al. | 384/295 |
| 7,214,037 B2 | 5/2007 | Mavrosakis | |
| 7,461,979 B2 * | 12/2008 | Mavrosakis | 384/512 |
| 7,654,796 B2 * | 2/2010 | Yeh et al. | 416/174 |
| 7,670,056 B2 * | 3/2010 | Petitjean et al. | 384/284 |
| 8,118,570 B2 * | 2/2012 | Meacham et al. | 417/407 |
| 8,303,188 B2 * | 11/2012 | Otsuka | 384/537 |
| 8,308,431 B2 * | 11/2012 | Ueno et al. | 415/178 |
| 8,444,321 B2 * | 5/2013 | Horvat | 384/537 |
| 8,459,875 B2 * | 6/2013 | Otsuka | 384/537 |
| 8,459,932 B2 * | 6/2013 | Nakano et al. | 415/112 |
| 2003/0103704 A1 * | 6/2003 | Nieman et al. | 384/537 |
| 2006/0127244 A1 | 6/2006 | Frankenstein et al. | |
| 2008/0080966 A1 | 4/2008 | Ueno et al. | |
| 2010/0172739 A1 * | 7/2010 | Arnold | 415/111 |
| 2011/0052388 A1 * | 3/2011 | Mavrosakis et al. | 415/229 |
| 2011/0052429 A1 * | 3/2011 | Marsal et al. | 417/407 |
| 2012/0045326 A1 * | 2/2012 | House et al. | 415/229 |
| 2012/0051906 A1 * | 3/2012 | House et al. | 415/229 |
| 2012/0121446 A1 * | 5/2012 | Meacham et al. | 417/407 |
| 2013/0202432 A1 * | 8/2013 | House et al. | 415/229 |
| 2013/0224015 A1 * | 8/2013 | Berruet et al. | 415/229 |

FOREIGN PATENT DOCUMENTS

| | | |
|---|---|---|
| JP | 09-177557 | 7/1997 |
| KR | 10-2004-0014244 | 2/2004 |

* cited by examiner

ANTI-ROTATION METHOD FOR A ROLLING ELEMENT BEARING CARTRIDGE

FIELD OF THE INVENTION

This invention is directed to the design of an anti-rotation system for a turbocharger rolling element bearing cartridge to constrain the bearing cartridge from rotation relative to the bearing housing.

BACKGROUND OF THE INVENTION

Turbochargers deliver air, at greater density than would be possible in the normally aspirated configuration, to the engine intake, allowing more fuel to be combusted, thus boosting the engine's horsepower without significantly increasing engine weight. This can enable the use of a smaller turbocharged engine, replacing a normally aspirated engine of a larger physical size, thus reducing the mass and aerodynamic frontal area of the vehicle.

Turbochargers are a type of forced induction system which use the exhaust flow, entering the turbine housing from the engine exhaust manifold, to drive a turbine wheel (51), which is located in the turbine housing. The turbine wheel is solidly affixed to a shaft to become the shaft and wheel assembly, the other end of which contains a compressor wheel (20), which is mounted to the stub shaft (56) end of the shaft and wheel and held in position by the clamp load from a compressor nut (29). The primary function of the turbine wheel is providing rotational power to drive the compressor.

The compressor stage consists of a wheel (20) and its housing. Filtered air is drawn axially into the inlet of the compressor cover by the rotation of the compressor wheel. The power generated by the turbine stage to the shaft and wheel drives the compressor wheel to produce a combination of static pressure with some residual kinetic energy and heat. The pressurized gas exits the compressor cover through the compressor discharge and is delivered, usually via an intercooler, to the engine intake.

In one aspect of compressor stage performance, the efficiency of the compressor stage is influenced by the clearances between the compressor wheel contour (28) and the matching contour in the compressor cover. The closer the compressor wheel contour is to the compressor cover contour, the higher the efficiency of the stage. The closer the wheel is to the cover, the higher the chance of a compressor wheel rubs; so, there must exist a compromise between improving efficiency and improving durability.

Figure 1:
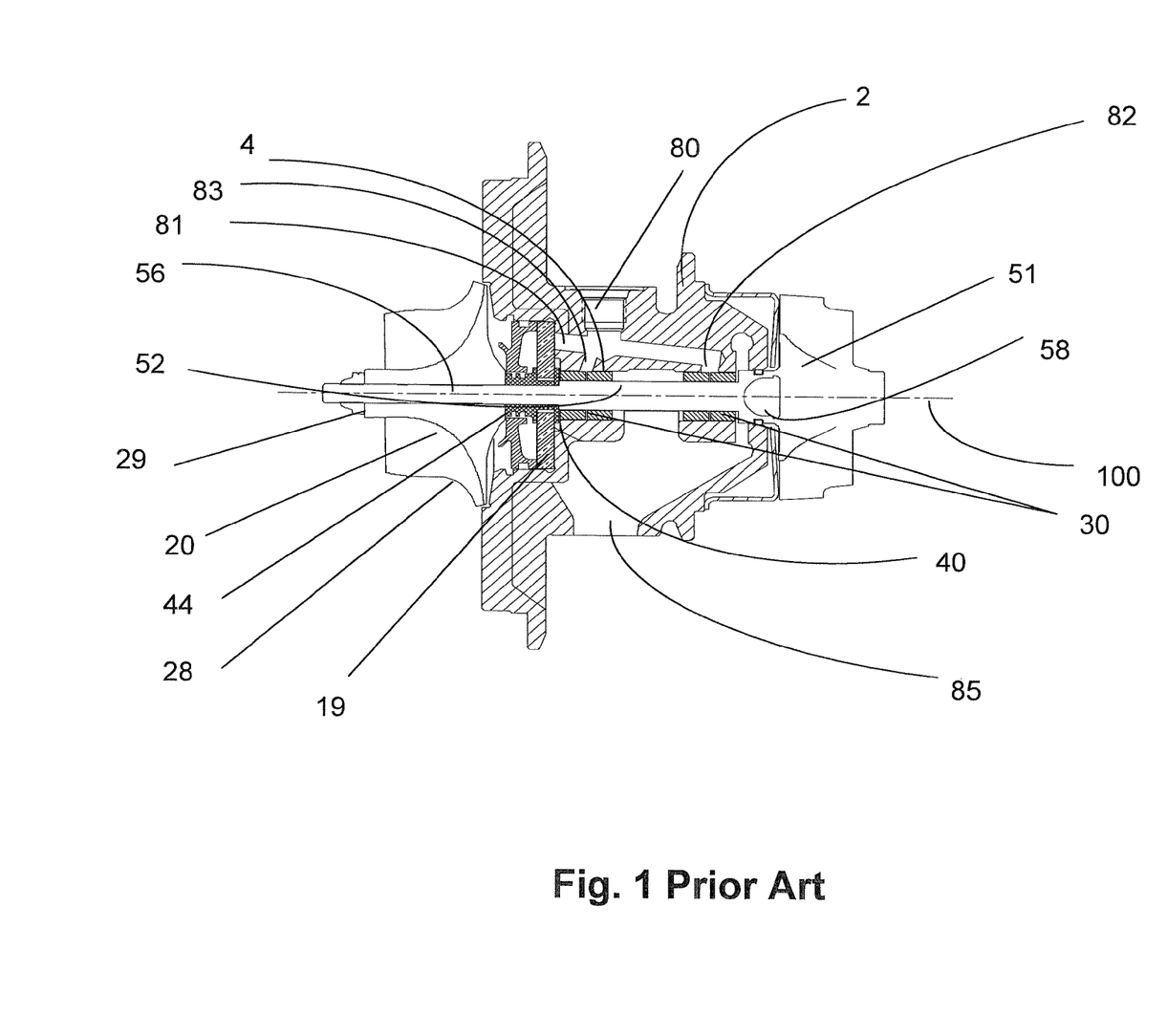
FIG. 1 depicts a section of a turbocharger assembly.
Figure 2:
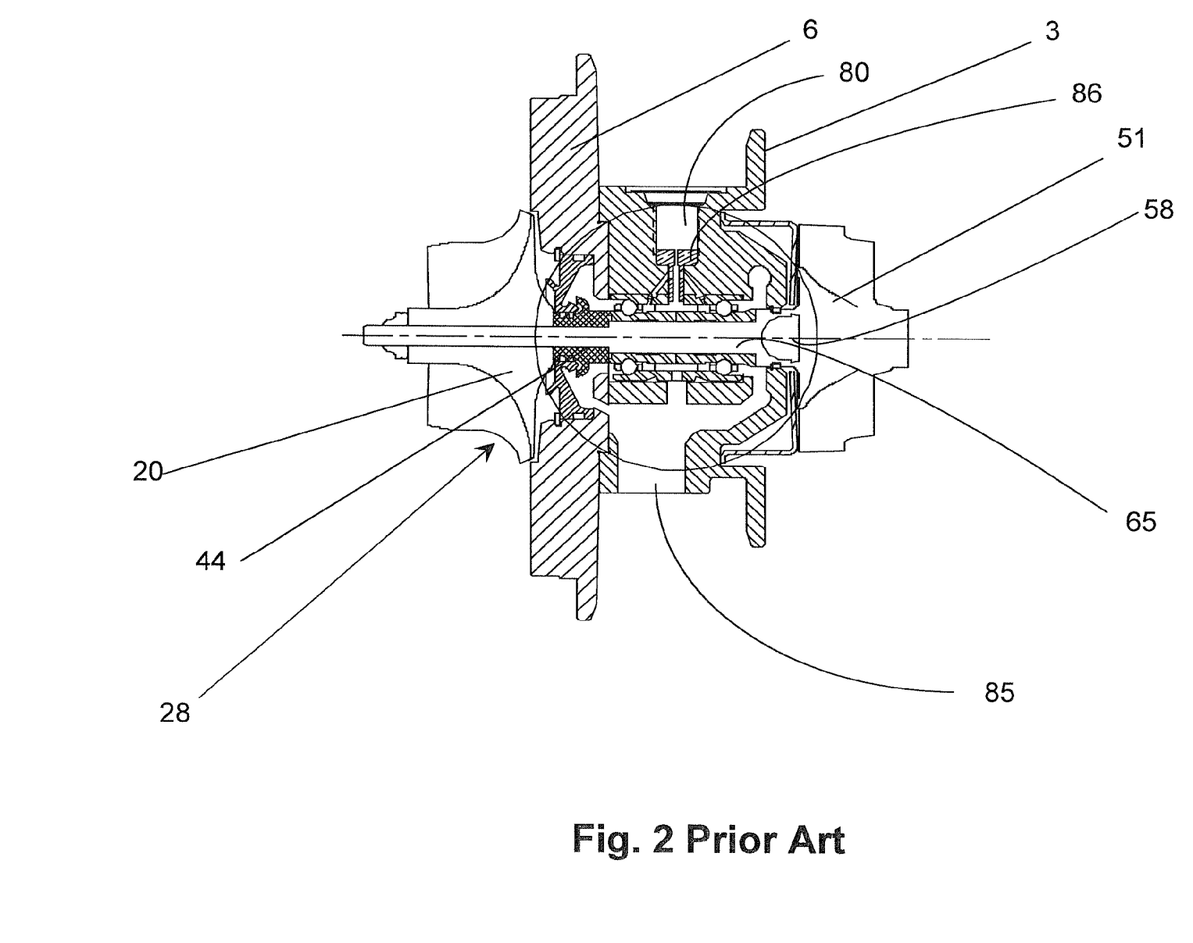
FIG. 2 depicts a section of a typical ball bearing turbocharger bearing housing assembly.

To the naked eye, the nose of the compressor wheel in a typical turbocharger appears to rotate about the geometric longitudinal axis of the bearing housing; however, when viewed as a track on an X,Y oscilloscope, the nose of the compressor wheel describes orbits of various shapes. The average centroid of the orbits is close to, but not exactly centered on, the geometric longitudinal axis of the turbocharger. The geometric axis (100) is shown in FIG. 1, of the turbocharger.

The dynamic excursions taken by the shaft are attributed to a number of factors including, the unbalance of the rotating assembly, the excitation of the pedestal (ie the engine and exhaust manifold), and the low speed excitation from the vehicle's interface with the ground.

The net effect of these excursions taken by the wheels is that the design of the typical turbocharger has clearances far greater than those desired for aerodynamic efficiency levels.

The typical turbocharger is fed with oil from the engine. This oil, at a pressure, typically equal to that of the engine, performs several functions. The oil is delivered to both sides of the journal bearings to provide a double hydrodynamic squeeze film, the pressures of which exert reactionary forces of the shaft on the ID of the bearing and of the OD of the bearing on the bearing housing bore. The oil films provide attenuation of the reactionary forces to reduce the amplitude of the excursions of the shaft. The oil also functions to remove heat from the turbocharger.

A typical turbocharger design has two adjacent bearing systems: one on the compressor-end of the bearing housing, and one on the turbine-end of the bearing housing. Each system has two interfaces: the interface of the rotating shaft on the I.D. of the floating bearing, and the interface of the O.D. of the floating bearing on the fixed bore of the bearing housing.

The stiffness and damping capacities of the typical turbocharger double hydrodynamic squeeze film bearings are a compromise between: the thickness of the film generated by the rotational speed of the bearing elements, the clearance between said elements, and the oil flow limitations due to the propensity of turbochargers to pass oil through the piston ring seals at either end of the shaft.

The use of REB bearings in a turbocharger solves several problems, including: high oil flow rates, bearing damping, and power losses through the bearing system.

FIG. 1 depicts a typical turbocharger double hydrodynamic squeeze film bearings configuration. In this configuration, pressurized oil is received to the bearing housing (2) though an oil inlet (80) from the engine. The oil is pressure-fed through the oil galleries (82 and 83) to the bearing housing journal bearing bore (4). For both the turbine-end and compressor-end bearings (30), the oil flow is delivered to the shaft and wheel journal bearing zones where the oil is distributed around the shaft to generate an oil film between the shaft surface (52) and the inner bore of the floating journal bearings (30). On the outside of the journal bearings (30), a like oil film is generated by the rotation of the journal bearing against the bearing housing journal bearing bore (4).

In the typical turbocharger depicted in FIG. 1, the thrust bearing (19) is also a hydrodynamic or fluid film type of bearing. In this configuration, the stationary thrust bearing is fed oil from the oil gallery (81) to feed a ramp and pad design of bearing. The oil is driven into a wedge shape by the relative motion of the thrust washer (40) and opposing face of the flinger (44), which is mounted to the shaft, against the static thrust ramp and pad. This bearing controls the axial position of the rotating assembly.

One method of increasing the efficiency of the turbocharger has been the adoption of rolling element bearings (REBs) to support the rotating assembly.

There are several improvements that come with the adoption of rolling element bearing turbochargers. There is an improvement in transient response due to the reduction in power losses, especially at low turbocharger RPM, of the REB system over the typical turbocharger bearing system. The power losses in REB systems are less than those for typical sleeve type turbocharger bearing systems. REB systems can support much greater thrust loads than can typical turbocharger bearing systems making the thrust component more robust. Since typical ramp and pad thrust bearings require a large percentage of the oil flow delivered to the turbocharger, and REB systems require less oil flow (than a typical turbocharger bearing system), then less oil flow is required for a REB system with the positive consequence that there is less propensity for oil passage to the compressor or turbine stages where that oil can poison the catalyst.

While ball bearing systems provide these efficiency and transient performance gains, the damping capacity of ball bearings is not as good as that of the typical turbocharger double hydrodynamic squeeze film bearings; so the ball bearings are retained in a steel cartridge, which is suspended within the bearing housing by an oil film between the O.D. of the cartridge and the I.D. of the bearing housing bore. The oil is used for damping of shaft critical events and for lubrication of the bearings.

U.S. Pat. No. 5,145,334 (Gutknecht), and U.S. Pat. No. 7,214,037 (Mavrosakis), teach methods for the retention of the bearing cartridge in the bearing housing. These methods allow for a floating bearing cartridge for which the axial and rotational forces are reacted upon by a post secured in the bearing housing while allowing for otherwise unconstrained motion of the bearing cartridge in the bearing housing. These methods require additional machining and assembly to the turbocharger at the manufacturing stage.

Figure 3:
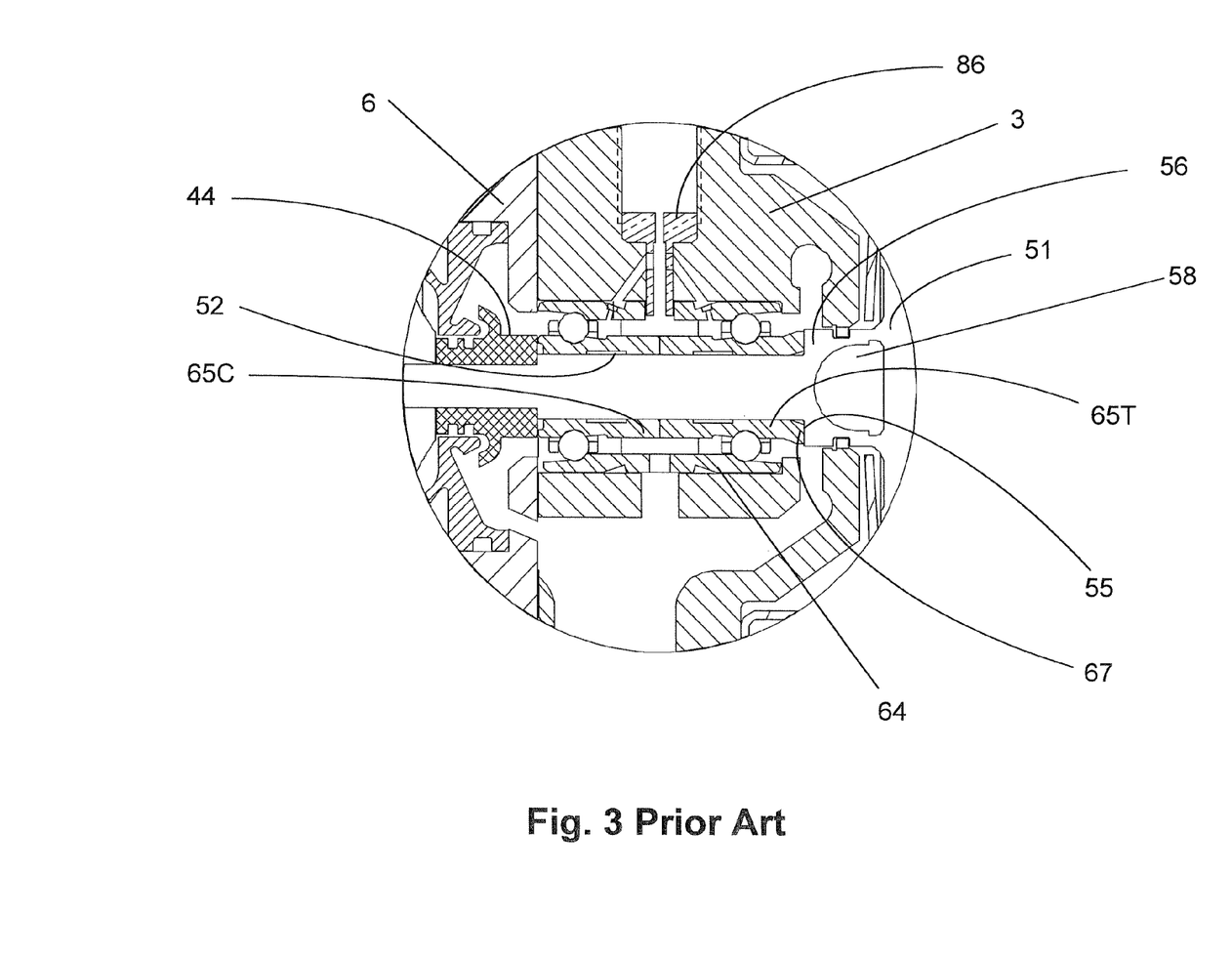
FIG. 3 depicts a magnified view of FIG. 2.

U.S. Pat. No. 5,145,334 (Gutknecht) and U.S. Pat. No. 7,214,037 (Mavrosakis) teach methods for the retention of a floating bearing cartridge in a bearing housing. A post secured in the bearing housing (e.g., restrictor 86) restrains the bearing cartridge such that the post reacts against the axial and rotational forces, while allowing for otherwise unconstrained motion (float) of the bearing cartridge in the bearing housing. In U.S. Pat. No. 7,214,037, as shown in FIG. 4, a pin (460) received by an opening (444) of the housing (440) optionally aids in locating the cartridge azimuthally, with respect to the housing (440). A pin (72) similar to that of U.S. Pat. No. 5,145,334 is shown in FIG. 3 of the present application, locating a bore (68) in the cartridge and a bore (70) in the outer race to provide both axial and rotational constraint relative to the bearing housing. Both of these methods require machining through orifices in the bearing housing, and, furthermore, they require intricate assembly in an area not well-visible to the assembler, making both correct assembly and verification of the assembly of said pins difficult.

So it can be seen that an improved method for preventing rotation of the outer race of the REB relative to the bearing housing is needed.

SUMMARY OF THE INVENTION

The inventors considered that the problems could be solved by requiring that the REB cartridge is mounted to the bearing housing in a way that is not rigid, thus allows for damping by an encapsulating oil film, but, at the same time, the REB cartridge must be held both axially, to transfer the axial loads to the bearing housing, and rotationally, so that the REB cartridge does not rotate relative to the bearing housing. There is thus a need for a cost-effective, simple to assemble, anti-rotation feature to allow a damping oil film around the REB yet prevent the REB assembly from rotating relative to the bearing housing.

The present invention provides a simple, assembly-foolproof, low cost, anti-rotation feature to allow a damping oil film around the REB yet prevent the bearing cartridge of a rolling element bearing assembly from rotating, relative to the bearing housing.

BRIEF DESCRIPTION OF THE DRAWINGS

The present invention is illustrated by way of example and not by limitation in the accompanying drawings in which like reference numbers indicate similar parts and in which.

DETAILED DESCRIPTION OF THE INVENTION

There are several methods for constraint of a ball bearing cartridge against rotation relative to the bearing housing in which it mounts. These methods such as those taught in U.S. Pat. No. 5,145,334 (Gutknecht), and U.S. Pat. No. 7,214,037 (Mavrosakis), employ bolts, studs, or pins constraining the bearing cartridge in the bearing housing. These bolts, pins, etc. must be assembled in the bearing housing assembly at the time of turbocharger assembly. The inventors recognized that, during the assembly process, the constraining pins, bolts, etc, taught in the prior art references, could be inadvertently omitted, and since they are relatively unsighted, being within the bearing housing walls, the omission of said constraining features would leave the bearing cartridge unconstrained both axially and rotationally. The absence of axial constraint would allow the wheels to contact the housings, and would allow the cartridge to spin in the bearing housing, each of which would shorten the life of the turbocharger.

In some versions of REB configurations, individual REB assemblies (meaning inner race, outer race, cage, balls and seals) are mounted, e.g., press-fit, into a "cartridge" or "sleeve" to retain and align the bearings. In other versions of REB configurations the outer race contains the machining of the two raceways, and the REB assemblies (inner races, cages, balls and seals) are assembled in this single outer race. In the present application and claims, the outer diameter, be it of the cartridge or sleeve or true outer race, will be referred to as "outer race" for ease of explanation of the various embodiments.

Figures 4A, 4B:
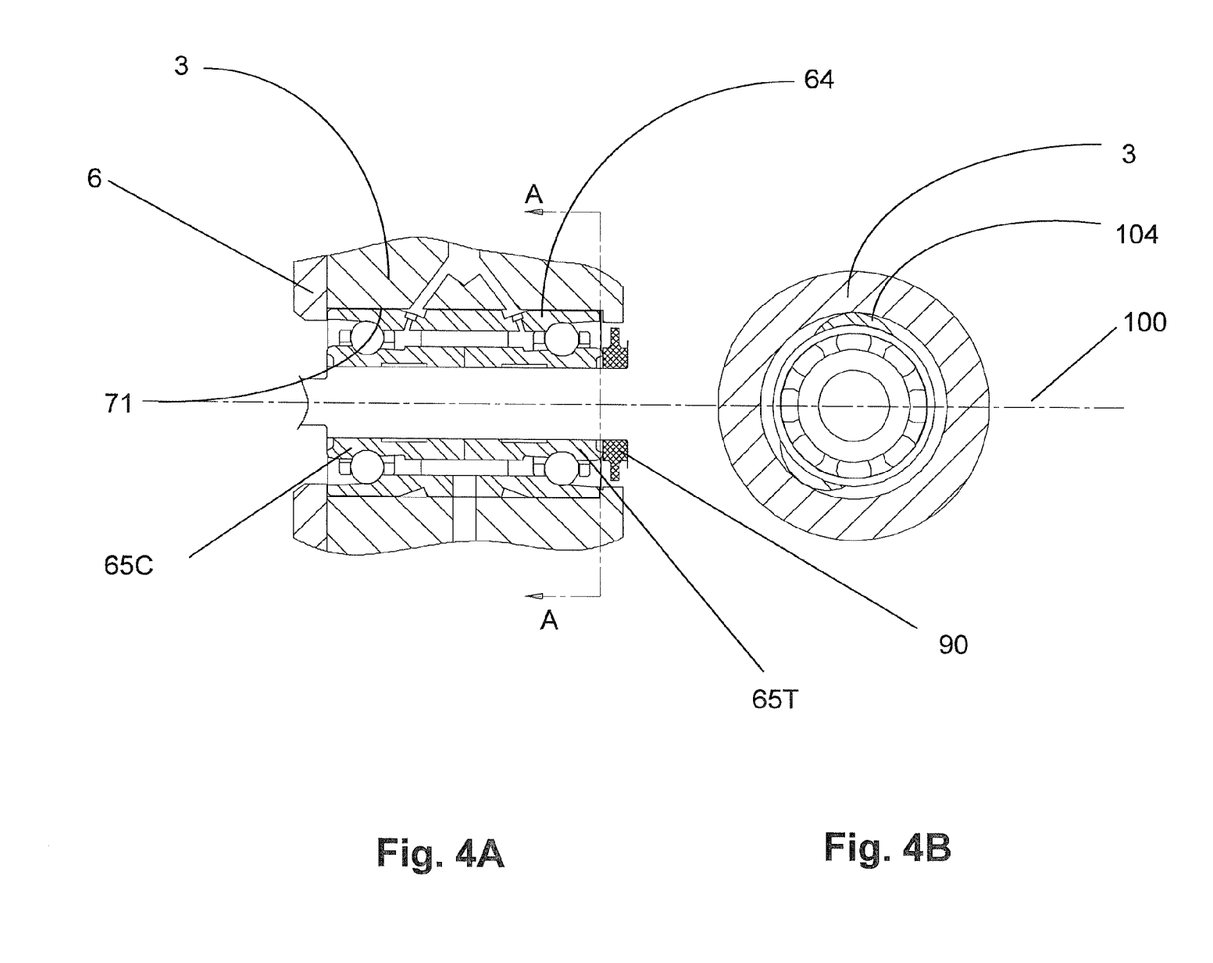
FIG. 4 depicts two section views of the first embodiment.
Figures 5A, 5B:
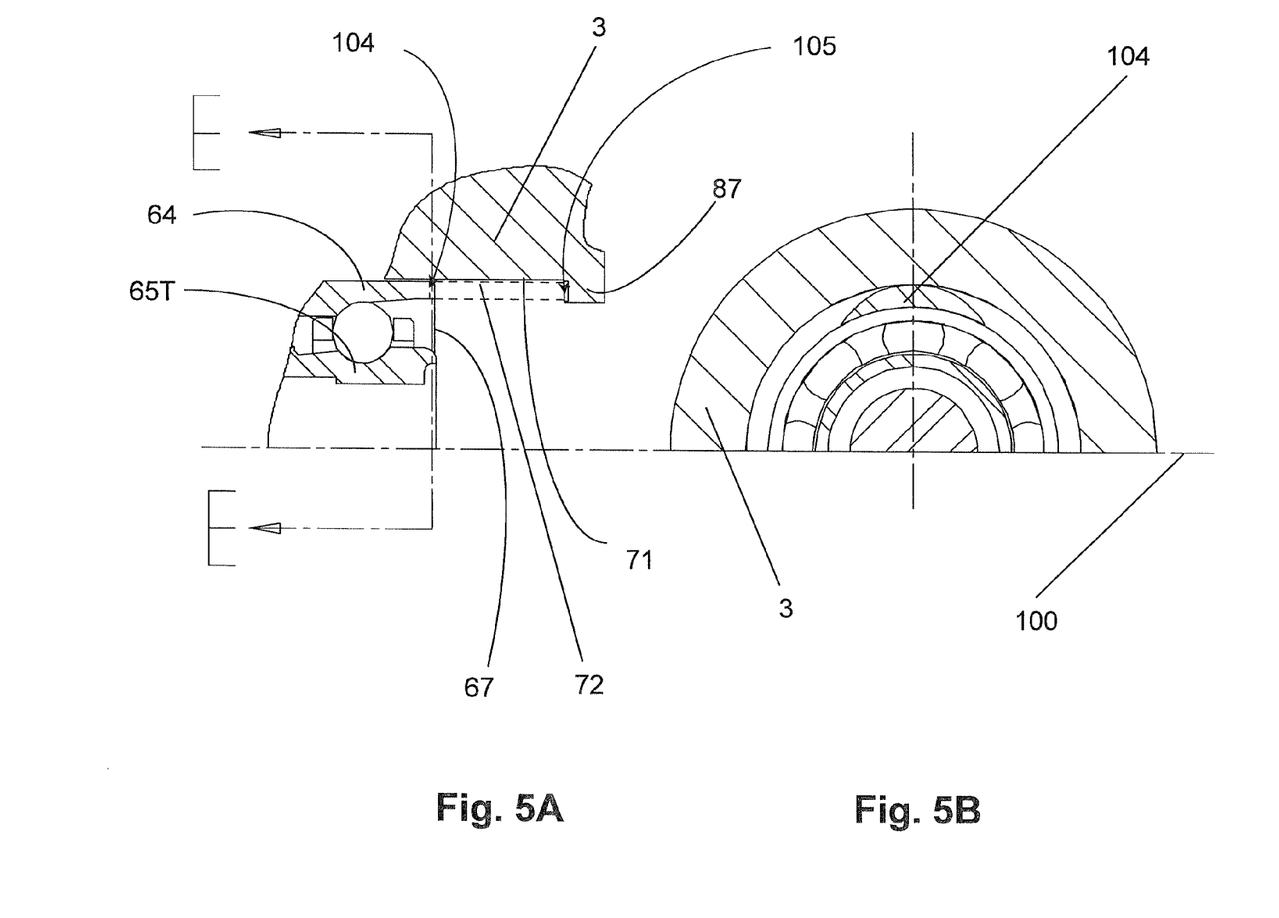
FIGS. 5A, 5B depict a separated view of the first embodiment.

In the first embodiment of the invention, the inventors designed an interface between the REB cartridge and the bearing housing, which both allowed ease of assembly and an anti-rotation feature. This embodiment takes advantage of the fact that at the turbine-end of the bearing housing bore there is an area of reduced diameter, an abutment (87), providing an axial location of the REB cartridge. By machining the turbine-end of the REB cartridge such that material is removed from the turbine-end face leaving only a projection, and by machining the reverse image of the male projection on the turbine-end of the REB cartridge into the bearing housing abutment (for example to form a scallop), the result is a bearing cartridge that can be fit into the bearing housing in a "lock and key" manner. In the exemplary embodiment of the invention, as depicted in FIGS. 4A, 4B and 5, the turbine-end face (67) of the REB cartridge, or outer race (64) is formed so as to leave projecting material in the shape of one or more tabs (104). One or more scallops (105), which are the reverse image of the formed projections on the REB, or outer race, turbine end, are machined into the compressor-end face of the bearing housing abutment (87).

The female shape (105), upon receiving the male tab (104) of the REB, or outer race, constrains the REB cartridge rotationally about the turbocharger axis (100). The asymmetrically spaced male tabs (104) in the turbine-end of the cartridge, or outer race (64) fit into these female shapes (105). In the exemplary first embodiment of the invention, there are two asymmetrically spaced tabs. The number and shape of the tabs is arbitrary to the anti-rotation function, but ensures correct orientation of the REB cartridge relative to the bearing housing oil galleries.

In FIG. 5A, the REB cartridge, or outer bearing race (64), is pulled back, towards the compressor end, from the bearing housing abutment (87) to show the projecting tab (104) in the REB cartridge, or outer race (64) and the recess (105), in the abutment (87) of the bearing housing (3). In FIG. 5B the view is of the REB end face, pulled back from and thus without showing the bearing housing abutment (87). A cross-section through the bearing housing abutment (87) at female recess (105) would show female recess (105) sized to matingly receive tab (104). The male tab (104) can extend axially less than the length of the REB cartridge, and preferably extends axially one or a few millimeters.

In a variation of the first embodiment of the invention, the male tab (104) can be machined into the compressor-end of the REB cartridge, and the female recess (105) can be machined into the bearing housing closure (6) to prevent rotation of the REB cartridge with respect to the bearing housing. The function, at either end, is the same. The former is easier to assemble; the latter method, more difficult. The REB cartridge locates in the bearing housing such that the male tab (104) protrudes from the joint plane of the bearing housing closure (6) to the bearing housing interface such that the protruding male tab fits into the reverse-imaged recess (105), machined into the bearing housing closure (6) in a "lock and key" manner.

Figure 6A:
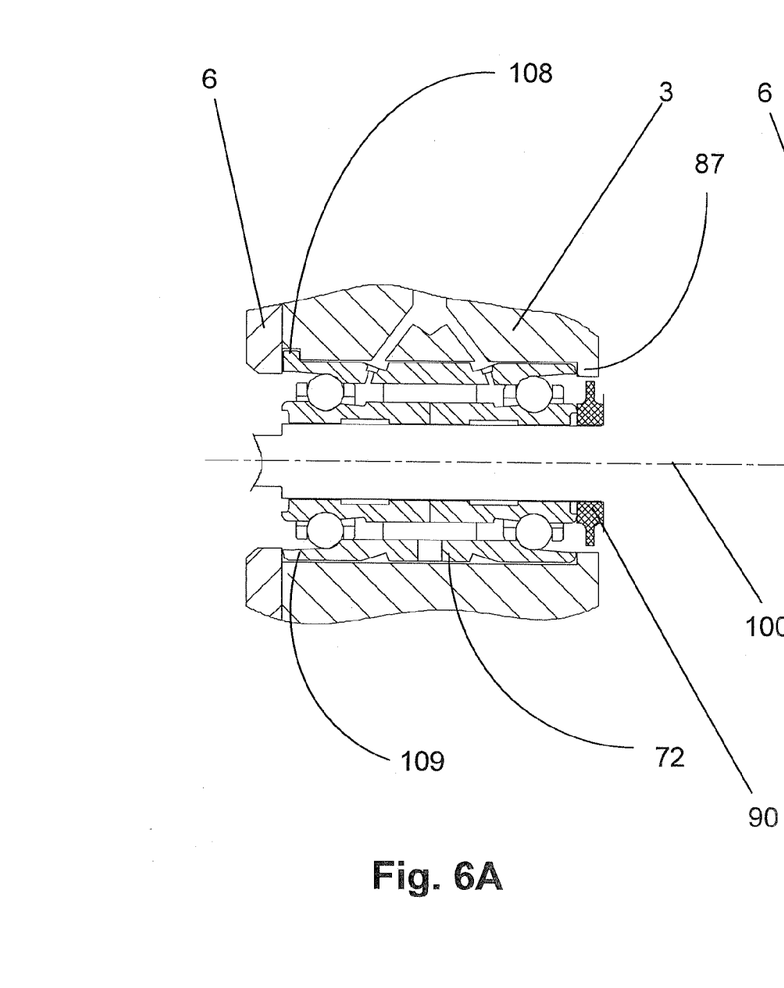
FIGS. 6A, 6B depict section views of a variation of the first embodiment.

In the second embodiment of the invention, as depicted in FIG. 6A, the anti-rotation feature projects from the outer diameter (72) of the REB. The function of this male tab, on an end-face external to the outer diameter (72) of the REB, is similar as that of the feature (105) in the above variation of the first embodiment of the invention.

In the exemplary second embodiment of the invention, as depicted in FIG. 6A, a male tab (108) is fabricated on the REB cartridge, or outer race, such that it protrudes from the outer diameter of the REB cartridge. The male feature (108) fits into a reverse-imaged feature (109), in the compressor-end of the bearing housing (3), to constrain the REB cartridge, or outer bearing race from rotation about the turbocharger axis (100), relative to the bearing housing, and to constrain the REB cartridge assembly in the axial direction, both towards the compressor-end and towards the turbine-end.

In a variation of the exemplary second embodiment of the invention, the male feature is formed as in the exemplary second embodiment of the invention, albeit protruding from the bearing housing face, and the reverse-imaged feature is fabricated into the face of the bearing housing closure (6) to constrain the REB cartridge, or outer bearing race, from rotation about the turbocharger axis (100), relative to the bearing housing, and to constrain the REB cartridge assembly in the axial direction, both towards the compressor-end and towards the turbine-end. In this case, the reverse-imaged feature (109) is not fabricated into the bearing housing (3).

Figure 6B:
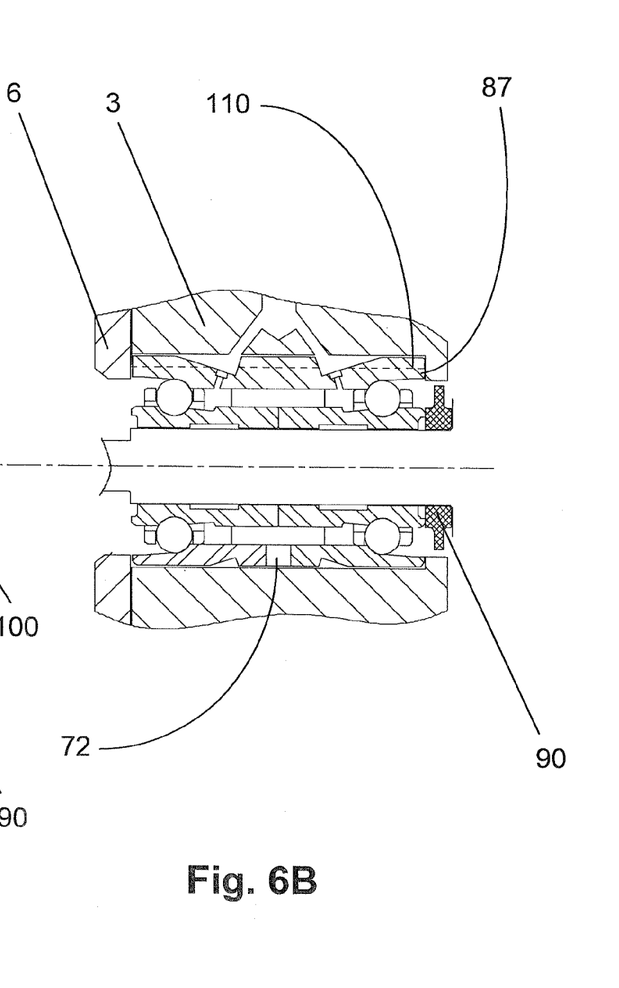

In yet another variation of the second embodiment of the invention, as depicted in FIG. 6B, the male anti-rotation feature (110) is fabricated to protrude the entire length of the REB cartridge, and the reverse-image feature is fabricated the entire length of the REB cartridge in the bearing housing to constrain the REB cartridge, or outer bearing race, from rotation about the turbocharger axis (100) relative to the bearing housing. In this case, the axial load towards the compressor-end must be constrained by the bearing housing closure (6), or in some other manner fabricated the length of the bore in the bearing housing.

Figure 7A:
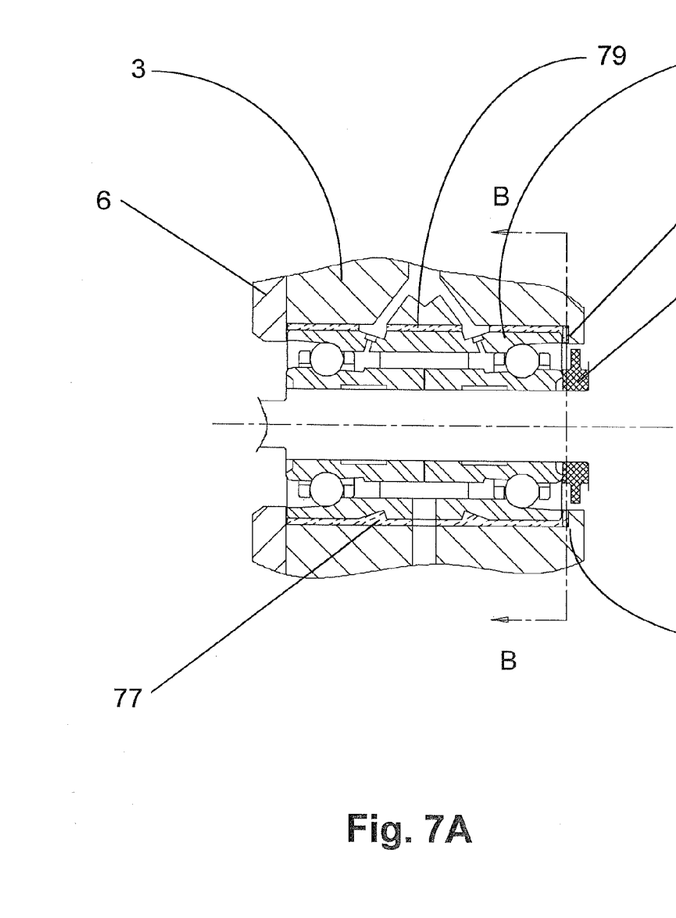
FIGS. 7A, 7B depict a variation on the first embodiment.
Figure 7B:
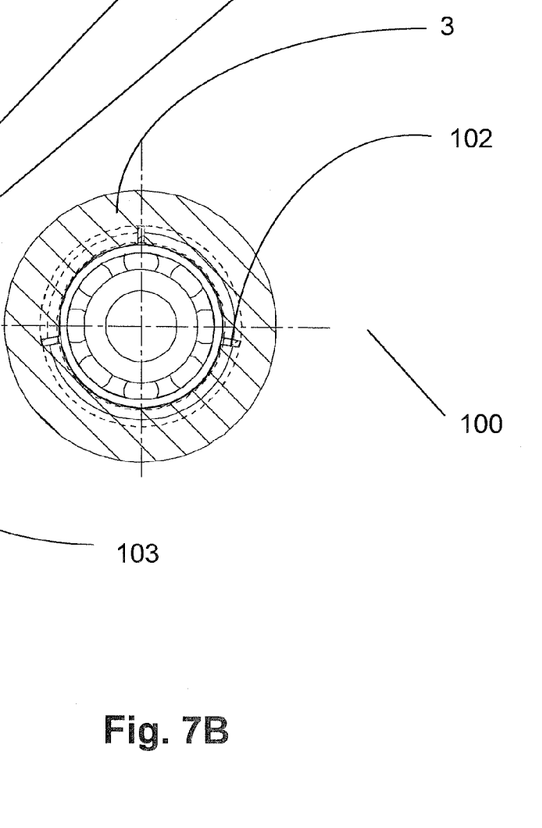

In the third embodiment of the invention, as depicted in FIGS. 7A and 7B, a sleeve (79) of low thermal conductivity encapsulates the REB cartridge, or outer race. The function of this sleeve primarily is to restrict the flow of heat from the turbine housing, through the bearing housing, and into the outer race of the REB. The sleeve per se can also be designed so as to provide an anti-rotation function. The REB cartridge, or outer bearing race, is encapsulated by a thermoplastic sleeve, the end face of which has fabricated into it a male anti-rotation feature (102) which slides into a female feature (103) in the turbine end face (87) of the bore (71) in the bearing housing (3).

In the exemplary third embodiment of the invention, this anti-rotation feature is three, asymmetrically-spaced protrusions, but it could be protrusions of any number or shape to adequately serve the function.

In a variation of the exemplary third embodiment of the invention, the female feature is fabricated into the compressor-end face of the bearing housing closure (6) to constrain the REB cartridge, or outer bearing race, from rotation about the turbocharger axis (100) relative to the bearing housing. The male anti-rotation feature is fabricated into the compressor end of the encapsulating sleeve (79).

Figure 8A:
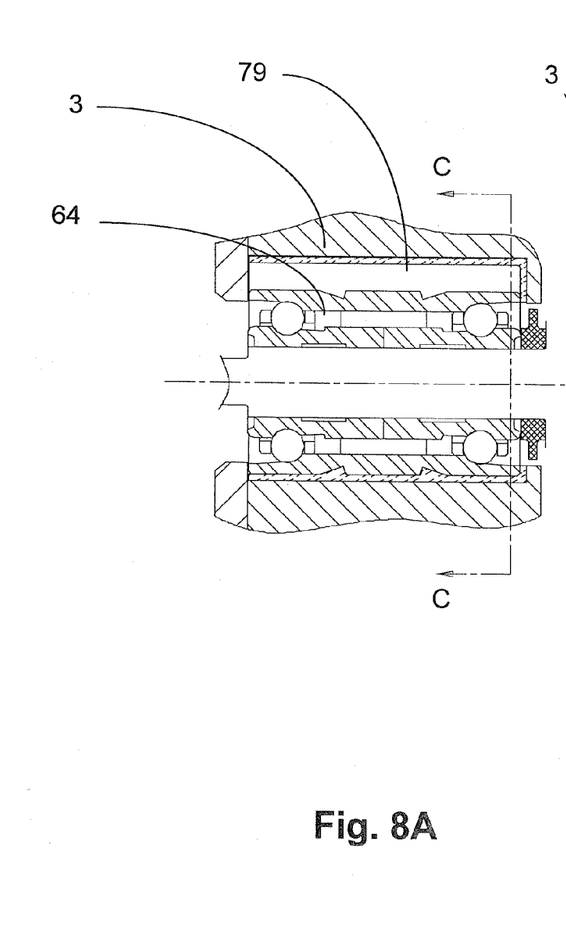
FIGS. 8A, 8B depict the fourth embodiment of the invention.
Figure 8B:
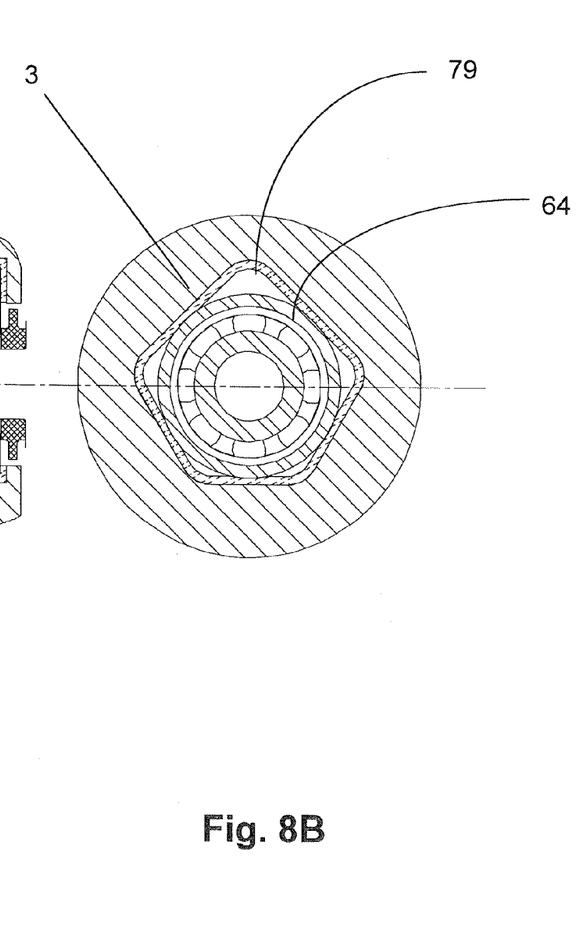

In the fourth embodiment of the invention, as depicted in FIGS. 8A, and 8B, the REB cartridge, or outer race, is held in a non-symmetrical, but substantially cylindrical sleeve which provides both thermal protection for the REB, in addition to providing an anti-rotation feature. One reason for the non-cylindrical outer shape is to provide a constraint for rotation of the REB cartridge with respect to the bearing housing. Another reason for the non-symmetrical shape is to effect correct alignment of the REB cartridge, or outer race, with respect to the oil galleries in the bearing housing.

The non-symmetric anti-rotation feature could be formed in the REB cartridge, or outer race, but this is not desirable from a thermal distortion standpoint. REBs which run at turbocharger speeds are designed and manufactured with extremely tight tolerances, which must be maintained to achieve acceptable bearing life. While a symmetric cylinder will expand symmetrically, a non symmetric shape will expand non-symmetrically due to the non-symmetric mass of material in the walls and this non-symmetric expansion will cause the bearing raceway to go out-of-round causing bearing distress.

While the sleeve, in the exemplary fourth embodiment of the invention, is full length on the outside surfaces, and all outside surfaces of the sleeve are adjacent to similar surfaces on the inside of the bearing housing, the inside surfaces of the sleeve do not describe a full contact with the REB cartridge. The sleeve can have another full surface, in contact with the outer surface (72) of the REB cartridge, or outer bearing race, and can be connected fully to the outer surface of the sleeve.

Now that the invention has been described, We claim:
1. A turbocharger including:
 a rotating assembly including a shaft (52) and a turbine wheel (51) solidly affixed to one end of the shaft;
 a bearing housing (3) including a bearing bore having a compressor end, a turbine end, a bearing bore internal diameter, and an abutment (87) formed by area of reduced diameter adjacent the turbine end of the bearing bore;
 a bearing housing closure (6) disposed at the compressor end of the bearing bore;

a rolling element bearing cartridge supported in said bearing housing, the cartridge comprising at least one inner race and at least one outer race (64), a series of rolling elements, each rolling element in contact with an inner and an outer race;

wherein said rotating assembly is supported for rotation by said rolling element bearing;

wherein a recess (105) is provided in the compressor-end face of the abutment (87) or in the turbine-end face of the bearing housing closure (6); and wherein one end of the outer race is reduced radially in diameter and axially in length except in an area (104) dimensioned to correspond to the recess (105), such that the recess (105) and the area of not reduced diameter (104) engage to prevent rotation of the outer race while in the assembled condition.

2. A turbocharger as in claim 1, wherein a recess (105) is provided in the compressor-end face of the bearing housing abutment (87); and the turbine-end of the outer race is reduced radially in diameter and axially in length except in an area (104) corresponding to the recess (105) provided in the compressor-end face of the abutment (87), such that the recess (105) provided in the compressor face of the abutment (87) and the area of not reduced radial diameter and axial length (104) at the turbine end of the outer race, engage to prevent rotation of the outer race while in the assembled condition.

3. A turbocharger as in claim 1, wherein a recess is provided in the turbine-end face of the bearing housing closure (6); and the compressor-end of the outer race is reduced radially in diameter and axially in length except in an area corresponding to the recess provided in the turbine-end face of the bearing housing closure, such that the recess provided in the turbine-end face of the bearing housing closure and the area of not reduced diameter and axial length at the compressor-end of the outer race, engage to prevent rotation of the outer race while in the assembled condition.

4. A turbocharger as in claim 1, further comprising a sleeve (79) of low thermal conductivity at least partially encapsulating the rolling element bearing cartridge.

5. A turbocharger including:

a rotating assembly including a shaft (52) and a turbine wheel (51) solidly affixed to one end of the shaft;

a bearing housing (3) including a bearing bore having a compressor end, a turbine end, a bearing bore internal diameter, and an area of reduced diameter (87) adjacent the turbine end of the bearing bore;

a bearing housing closure (6) disposed at the compressor end of the bearing bore;

a rolling element bearing cartridge supported in said bearing housing, the cartridge comprising at least one inner race and at least one outer race (64), each race provided with at least one raceway, a series of rolling elements, each rolling element in contact with an inner and an outer raceway;

wherein said rotating assembly is supported for rotation by said rolling element bearing;

wherein a projection (106, 108) is provided projecting radially at one end of the outer race, wherein a recess is provided in the bearing housing or the turbine-end face of the bearing housing closure (6) corresponding to the projection (106, 108), such that the recess and projection engage to prevent rotation of the outer race while in the assembled condition.

6. A turbocharger as in claim 5, wherein a projection (108) is provided projecting radially at the compressor end of the outer race, and a recess is provided in the bearing housing corresponding to the projection (108), such that the recess and projection engage to prevent rotation of the outer race while in the assembled condition.

7. A turbocharger as in claim 5, further comprising a sleeve (79) of low thermal conductivity at least partially encapsulating the rolling element bearing cartridge.

8. A turbocharger including:

a rotating assembly including a shaft (52) and a turbine wheel (51) solidly affixed to one end of the shaft;

a bearing housing (3) including a bearing bore having a compressor end, a turbine end, a bearing bore internal diameter, and an abutment (87) formed by area of reduced diameter adjacent the turbine end of the bearing bore;

a bearing housing closure (6) disposed at the compressor end of the bearing bore;

a rolling element bearing cartridge supported in said bearing housing, the cartridge comprising at least one inner race and at least one outer race (64), each race provided with at least one raceway, a series of rolling elements, each rolling element in contact with an inner and an outer raceway;

a sleeve (79) of low thermal conductivity at least partially encapsulating the rolling element bearing cartridge;

wherein said rotating assembly is supported for rotation by said rolling element bearing;

wherein male anti-rotation features (102) are provided projecting axially from the compressor-end or turbine-end of the sleeve (79) or projecting radially from the compressor-end of the sleeve (79), wherein female features (103) are provided axially in the compressor face of the abutment (87) of the bore (71) in the bearing housing (3), or radially at the compressor end of the bearing bore (71), or axially at the turbine face of the bearing housing closure (6); and wherein said male and female features cooperate to prevent rotation of the outer race when in the assembled condition.

9. A turbocharger as in claim 8, wherein said male and female features are provided in an asymmetric pattern.

10. A turbocharger including:

a rotating assembly including a shaft (52) and a turbine wheel (51) solidly affixed to one end of the shaft;

a bearing housing (3) including a bearing bore having a compressor end, a turbine end, a bearing bore internal diameter, and an area of reduced diameter (87) adjacent the turbine end of the bearing bore; and a rolling element bearing supported in said bearing housing, the roller element bearing comprising at least one inner race and at least one outer race (64), a series of rolling elements, each rolling element in contact with an inner and an outer race;

wherein the bearing housing bore has an asymmetric cross-section; and wherein a thermal insulating jacket at least partially surrounds the outer race, the jacket having an asymmetric outer cross section corresponding to the bearing housing bore asymmetric cross-section, the jacket being mechanically or chemically connected to the outer race and preventing rotation of the outer race when in the assembled condition when said rotating assembly is supported for rotation by said rolling element bearing.

* * * * *